(12) United States Patent
Kikinis et al.

(10) Patent No.: US 8,695,042 B2
(45) Date of Patent: *Apr. 8, 2014

(54) PROGRAMMING AND CONTENT RECOMMENDATIONS

(75) Inventors: Dan Kikinis, Saratoga, CA (US); Yakov Kamen, Cupertino, CA (US); Brian Kimball, Burlingame, CA (US)

(73) Assignee: JLB Ventures, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/099,071

(22) Filed: May 2, 2011

(65) Prior Publication Data

US 2011/0209174 A1 Aug. 25, 2011

Related U.S. Application Data

(63) Continuation of application No. 12/725,917, filed on Mar. 17, 2010, now Pat. No. 7,958,533, which is a continuation of application No. 10/179,708, filed on Jun. 24, 2002, now Pat. No. 7,703,119.

(60) Provisional application No. 60/301,087, filed on Jun. 25, 2001.

(51) Int. Cl.
*G06F 3/00* (2006.01)
*G06F 13/00* (2006.01)
*H04N 5/445* (2011.01)
*H04N 7/173* (2011.01)

(52) U.S. Cl.
USPC .............................. 725/61; 725/46; 725/100

(58) Field of Classification Search
None
See application file for complete search history.

(56) References Cited

U.S. PATENT DOCUMENTS

| | | | |
|---|---|---|---|
| 5,526,034 A | 6/1996 | Hoarty et al. | |
| 5,550,578 A | 8/1996 | Hoarty et al. | |
| 5,592,551 A * | 1/1997 | Lett et al. | 380/211 |
| 6,016,141 A | 1/2000 | Knudson et al. | |
| 6,034,678 A | 3/2000 | Hoarty et al. | |
| 6,100,883 A | 8/2000 | Hoarty | |
| 6,205,582 B1 | 3/2001 | Hoarty | |
| 6,539,548 B1 * | 3/2003 | Hendricks et al. | 725/109 |
| 6,684,400 B1 | 1/2004 | Goode et al. | |
| 6,898,762 B2 * | 5/2005 | Ellis et al. | 715/716 |
| 7,013,478 B1 * | 3/2006 | Hendricks et al. | 725/46 |
| 7,146,627 B1 | 12/2006 | Ismail et al. | |
| 2003/0005432 A1 * | 1/2003 | Ellis et al. | 725/13 |

* cited by examiner

*Primary Examiner* — Oschta Montoya
(74) *Attorney, Agent, or Firm* — Banner & Witcoff, Ltd.

(57) ABSTRACT

Method and system for enabling users to perform self-service operations in interactive TV environments. In one embodiment, the method enables users to select and activate programming channels via a content receiving device, thereby eliminating the need for the users to have to call a call center or content provider to activate previously unavailable or inaccessible content. Using a set of interactive screens, the user is enabled to view programming channel information, including comparative information. In one embodiment, the method assists users who are moving to activate/reactive programming and content services. For example, options are provided to enable the user to schedule service work, disconnect and activate services, and other activities connected with the move. In another embodiment, the method enables a user to select a programming channel based on channels that are recommended by the system. Historic usage patterns, including viewing habits and attempts to access unavailable content are analyzed to determine which programming channels should be recommended for the user.

19 Claims, 4 Drawing Sheets

PROGRAMMING AND CONTENT RECOMMENDATIONS

CROSS-REFERENCE TO RELATED APPLICATIONS

This application is a continuation of co-pending application Ser. No. 12/725,917 filed Mar. 17, 2010 which is a continuation of U.S. Pat. No. 7,703,119 filed Jun. 24, 2002, entitled "CUSTOMER SELF SERVICE IN INTERACTIVE TV ENVIRONMENT FOR TV PROGRAMMING PACKAGES," and issued Apr. 20, 2010, which claims the benefit of the filing date from U.S. Provisional Patent Application, entitled "CUSTOMER SELF SERVICE IN INTERACTIVE TV ENVIRONMENT FOR TV PROGRAMMING PACKAGES," Ser. No. 60/301,087 filed on Jun. 25, 2001. The contents of the above applications are hereby incorporated by reference in their entirety.

FIELD OF ART

The field of the invention relates generally to broadcast reception equipment, and more specifically but not exclusively relates to interactive television environments and set-top boxes and the like that are used to support such environments.

BACKGROUND

In the current art of interactive programming guides (IPGS) for television viewing, when a user receives a set-top box he typically needs to call a call center to have the box activated. The activation process typically includes providing account information and may include a credit check. Once the account has been approved, the set-top box can be activated.

Presently, the only exceptions for this tedious, inconvenient process are add-on services such as WebTV™ and TiVO™, which allow users to activate their services by themselves. However, those systems differ from most television programming providers in that they don't offer a great variety of viewing packages. Instead, such add-on service, typically offer only one or two packages, with one or two payment options each.

The reason programming providers such as cable operators and satellite operators prefer to have the customer call into a call center is that it provides an opportunity to up-sell the client to better, more expensive programming packages, and hence generate more revenue.

What is clearly needed is a system for an automated up-sell process that could interactively query the customer and, based on customer responses, out of the multitude of available packages could then generate suggestions for programming packages designed to appeal to him, thus retaining the advantages for the provider of selling better programming packages to the customer, while avoiding for the customer the inconvenience of having to call into a call center.

SUMMARY

In accordance with aspects of the present invention, methods and systems are disclosed for enabling users to perform self-service operations in interactive TV environments. In one embodiment, a method is provided to enable users to select and activate programming packages via a set-top box, thereby eliminating the need for the users to have to call a call center to activate the unit. Using a set of interactive screens, the user is enabled to view various programming package information and promotions. For example, comparative information listing various features of respective programming packages may be provided in a tabular layout such that the user can easily compare the differences between packages. Upon selection of a package, the method further enables the user to activate broadcast services corresponding to the selected package.

In accordance with another aspect of the invention, a method is provided to assists users who are moving to activate/reactive broadcast services. Options are provided to enable the user to schedule service work, disconnect and activate services, and other activities connected with the move. For example, the user may schedule a service technician to install equipment or wiring at the new location. The method also advises a user if he has to return a set-top box, in instances in which a current service provider who leases the set-top box to the user does not provide service to the new location.

In accordance with yet another aspect of the invention, a method is provided to assist a user in selecting an appropriate programming package based on packages that are recommended by the system. Historic usage patterns, including viewing habits and attempts to access unavailable content are analyzed to determine which programming packages should be recommended for the user. Information pertaining to the recommended packages is then presented to the user, and the user is enabled to select and activate one of the packages.

According to other aspects of the invention, the method may be implemented via software running on the system, which will typically comprise a set-top box or the like. In general, the software may be provided with the set-top box, or downloaded from a broadcast service provider or third party via a communication interface built into the set-top box.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and systems for enabling users to perform self-service activities in an interactive TV environment, such as activating a selected broadcast service programming package, are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
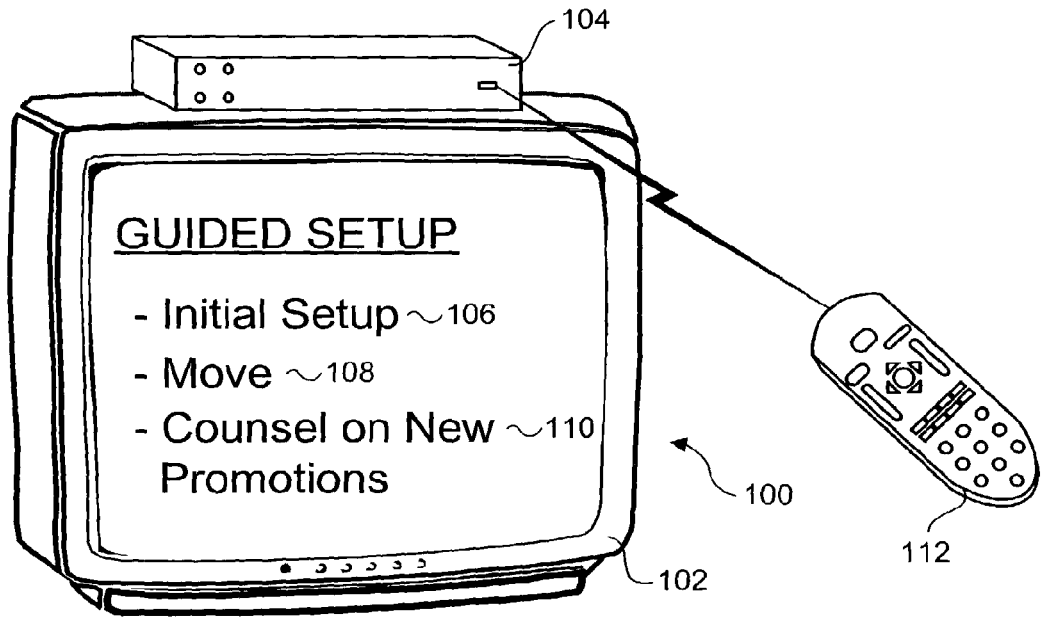
FIG. 1 is a representation of a display window corresponding to an initial interactive screen from which a user may select various self-service operations.

FIG. 1 shows a screen 100 displayed on a television 102 that is typical of what may be presented to a user while performing set-up operations pertaining to an interactive television device, such as a set-top box 104. Screen 100 has, for example, guided set-up options, such as an "Initial Setup" option 106, a "Move" option 108 (to help the customer change service when, for example, he moves to another address), and a "Counsel on New Promotions" option 110, which the customer might desire to access if he sees advertisements for new packages and he's interested in learning more about them and seeing if any of the new packages are more appropriate for him than his existing package. Generally, the user will navigate to various screens and select menu options using an input device such as a remote control 112.

In general, the processes described herein will be enabled through software running on a set-top box. Depending on the implementation, a particular process may comprise ongoing interaction with a broadcast service provider service center in a matter somewhat akin to a client-server operation, or may comprise collecting various information from the user, and then submitting the information to the broadcast service provider. In the first case, the set-top box will need to be connected to the broadcast service provider service center prior to initiating the process. In the second case, a similar connection may not be required to be initiated until some point after the process begins. Accordingly, since the operation of connecting to the broadcast service provider may apply at various stages of the processes describe herein, this operation is not shown in the drawing figures; however, such a connection operation is implied to occur during the processes, when and if applicable.

Figure 2:
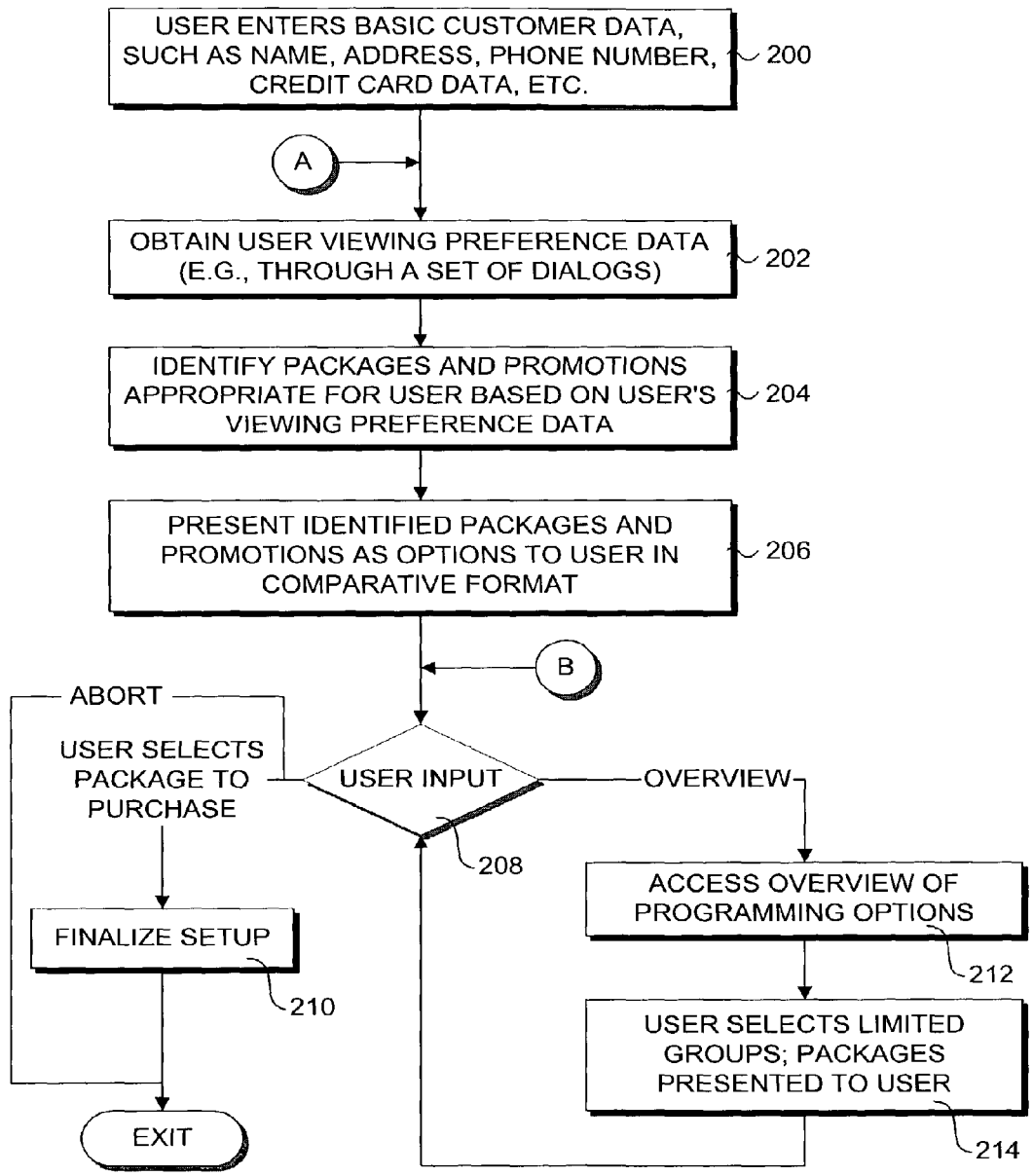
FIG. 2 is a flow diagram illustrating operations and logic implemented by the system to enable a user to set-up broadcast service access via a set-top box.

A flow diagram corresponding to an initial set-up process in accordance with one embodiment of the invention is shown in FIG. 2. This process begins in a block 200, in which the user will enter basic customer account data, such as name, address, phone number, credit card data, etc. After entering the customer account data, the user will be presented with a set of screens or dialogs in which the user will select viewing preferences, as depicted by a block 202. For example, the viewing preferences may include questions covering broad viewing categories, such as what general types of content the user prefers (e.g., movies, sports, news, etc.) and more particular questions pertaining to selected categories, such as what types of movies the user prefers. In a block 204, the user preference data is processed and viewing packages and/or promotions that are most appropriate for the user are identified based on the user preference data. The user is then presented with the identified packages and/or promotions in a block 206. In one embodiment, the packages and promotions are displayed in a comparative format, wherein the features and costs of the various options are displayed in a manner that enables the user to compare costs and features relatively easily. For example, the various packages and promotions may be presented in a comparison table, with bubbles or the like hailing certain advantages of one package over another.

At this point, the user is enabled to select various options, as depicted by a user input decision block 208. Under one case, the user selects one of the listed packages or promotions to activate. In response, final setup operations are performed in a block 210. For example, the final setup may include receiving an authorization code to enable the selected package to be accessed via the set-top box, or may include final authorization for charges, etc. After the final setup operations have been performed, the process is completed, as indicated by the "Exit" block in the figures.

Under another case, the user may select an overview option, whereby the user may access a total overview of all programming options, as depicted by a block 212. Depending on the complexity and number of options, this information may involve displaying information pertaining to one or more groups of programming packages via one or more interactive screens. From this navigation point, the user may "drill-down" to obtain further details on selected packages and the like. For example, the user might make a limited selection of packages in various different groups and have those packages presented to him in accordance with a block 214, in a manner similar to the comparison of packages in block 206 discussed above.

In general, the user will be able to navigate among various screens via well-known navigation techniques, such as activation of on-screen buttons and/or using navigation buttons on a remote control that are configured for such purposes. These techniques are well-known in the art, and accordingly, further details are not disclosed herein. Included among the operations is an abort option, which will enable the user to abort a particular operation, or the set-up operation itself.

Figure 3:
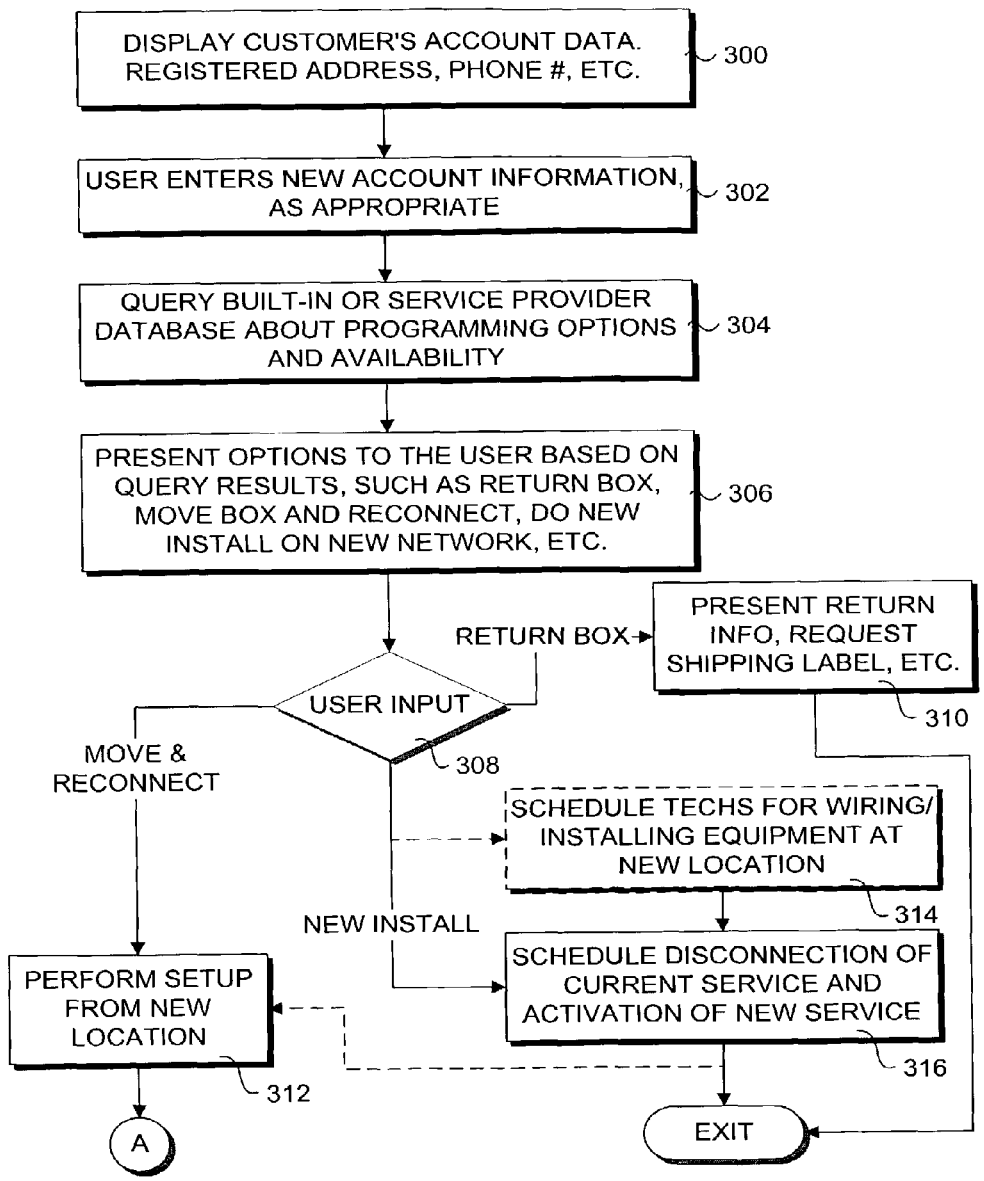
FIG. 3 is a flow diagram illustrating operations and logic implemented by the system to assist a user who is moving.

A flow diagram corresponding to a process that is initiated in response to selection of "Move" option 108 on screen 100 is shown in FIG. 3. In a block 300, the user is presented with current account data, such as registered address, phone number, etc. In general, this may require the set-top box to establish a communications link with the service provider service cent, whereupon the account data are retrieved from a database hosted by the service center. Optionally, such information may be maintained on the set-top box itself In a block 302, the user enters new account information, as appropriate. For example, the user will usually enter a new address and phone number, although in some instances the phone number will remain the same. Upon completing entry of the new information, the user will activate an "update" button or a similar navigation element to update the user's account information.

In response to entry of the new account information, a query will be performed to determine the available programming options corresponding to the new location. In one embodiment, this query may be performed using programming package data that are stored on the set-top box itself. For example, such data may be provided with the set-top box and/or downloaded to the set-top box on a periodic basis. In another embodiment, the query will be performed against data in the service provider's database, with the results of the query forwarded to the set-top box via the communication link with the service provider service center.

Once the query is performed, corresponding navigation options are presented to the user in a block 306. For example, the options might indicate that the user must return the box (if no service is available at the new location), or enable the user to move the box and reconnect to using a current service. Another option might correspond to performing a new installation on a new network.

In response to a user input corresponding to a selected option, as depicted by decision block 308, corresponding operations will be performed. For instance, in response to selecting a return box option, the user could be presented with a dialog box that provides a return address or phone number to call to have the unit picked up, as depicted by a block 310. Optionally, the interface might enable a user to select to have a prepaid shipping label sent to the user, whereby the user could ship the unit back to the service provider. In response to a "Move and Reconnect" option, the user might be presented with a series of screens to enable the user to set-up the set-top box at the new location, as depicted by a block 312. These operations might further include some or all of the set-up operations discussed above with reference to FIG. 2, as depicted by the encircled "A's" in FIGS. 2 and 3, which illustrate a "jump-to" operation.

If the user selects a new installation option, there are several activities the user may be required to have performed prior to activating a service. For example, if the new location isn't wired for cable or satellite service, the user may be provided with one or more screens via which the user could schedule a service technician to install any necessary equipment. These activities are depicted by a block 314, wherein the dashed lines indicate the activities are optional. As shown in a block 316, the user may also be presented with screens to enable the user to schedule disconnection of a current service and activation of the new service.

As discussed above, the navigation scheme enables users to jump to other screens and processes, as appropriate, using well-known navigation techniques. For example, the user could navigate to a screen corresponding to block 312 after scheduling disconnection of a current service.

Figure 4:
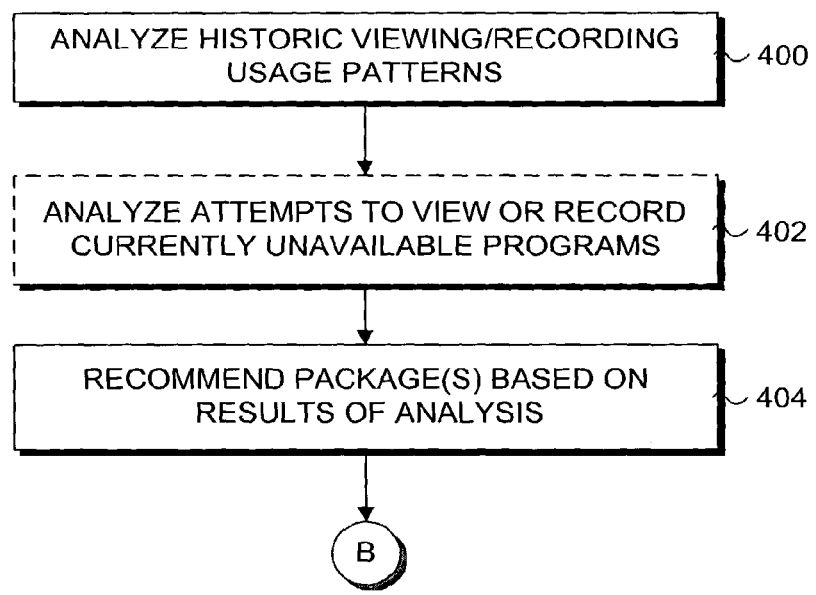
FIG. 4 is a flowchart illustrating operations implemented by the system to assist a user in selecting an appropriate programming package based on historic usage information.

A flow diagram corresponding a process that is initiated in response to activation of "Counsel on New Promotions" option 110 is shown in FIG. 4. Typically, a customer may select this option after having seen a promotion offering a new programming package, or the customer may be prompted through an interactive ad to review his current subscription versus his actual usage pattern. In a block 400, the customer's historic usage pattern is analyzed. For example, a use-tracking program may be implemented on the set-top box to track the user's viewing habits. In general, such information is used to reveal viewer preferences based on observed usage. For example, a record of the amount of time a user spends watching various channels might be kept. In another embodiment, each program might have some type of content identifier (such as sports, news, drama, comedy, etc.), and the tracking information could contain an aggregation of time spent viewing content corresponding to each category.

In addition to tacking actual viewing usage, it might also be valuable to track attempts to access unavailable programming. For example, many electronic program guides (EPGs) provide details of scheduled content broadcast by a corresponding service provider. Typically, the listed content (e.g., television shows, movies, etc.) may include content corresponding to the most comprehensive programming packages available from the service provider, such as including content that will be broadcast over all of the stations supported by the service provider. As a result, some of this content will not be available for viewing or recording in situations in which the user doesn't subscribe to a programming package that includes the originating channel the content is broadcast over. For example, a user may attempt to view or record a program on a premium channel not included in the user's current programming package.

In accordance with this consideration, in one embodiment such attempts to access unavailable programs are analyzed in a block 402. In a block 404, one or more packages are recommended to the user based on the analysis' performed in block 400 and optional block 402. For example, if analysis of a user's usage pattern indicates the user watches a lot of sports programming, the user may be interested in subscribing to a premium sports channel, or to subscribe to a premium sports package. Along similar lines, if the analysis in block 402 indicates that a user has attempted to access an unavailable channel multiple times, one or more packages that include the channel might be recommended to the user.

Figure 5:
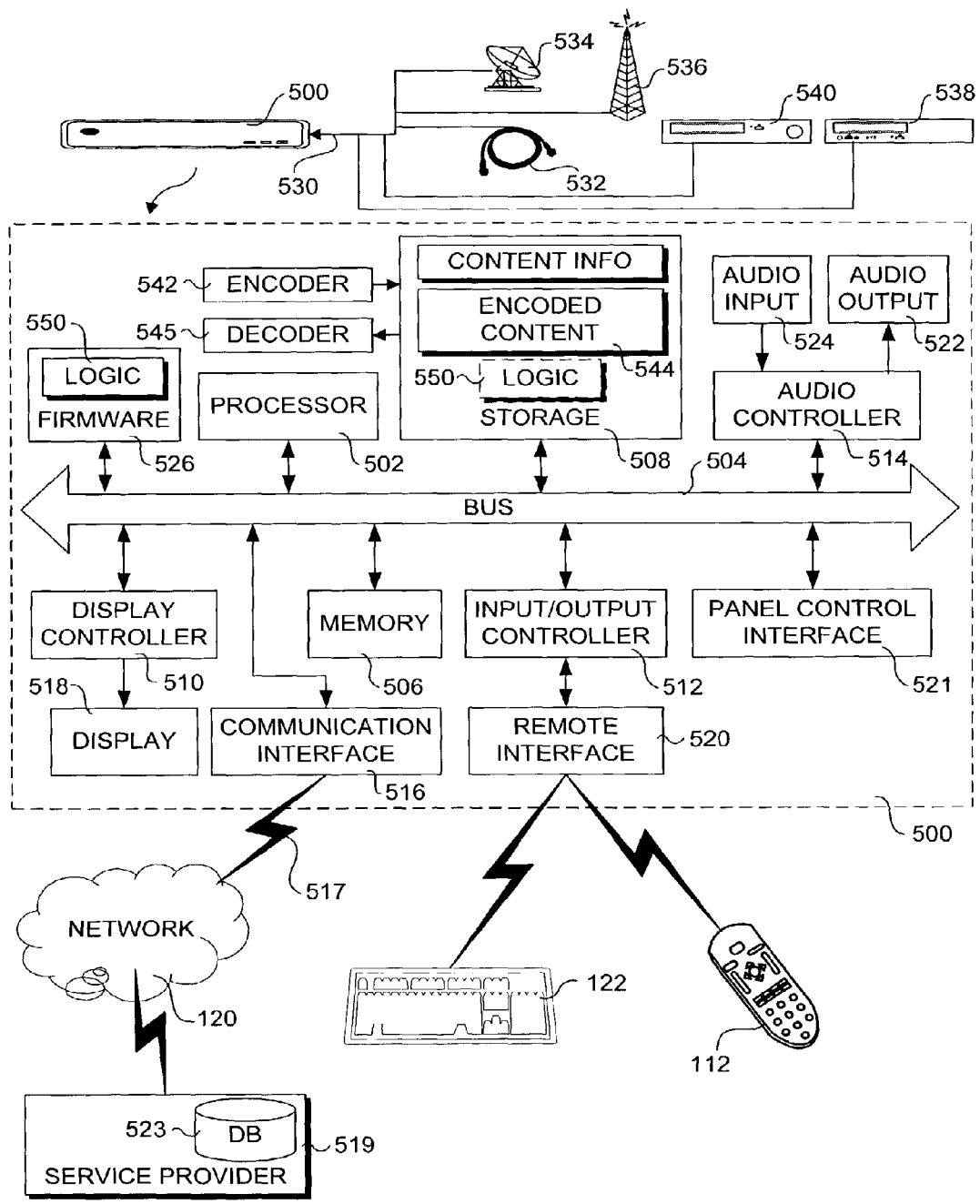
FIG. 5 is a schematic block diagram illustrating various components in a machine that may be used to implement the operations of various embodiments of the invention described herein.

A schematic block diagram illustrating various components and operations of an exemplary machine 500 for implementing the embodiments of the invention discussed above is shown in FIG. 5. Generally, machine 500 is representative of "set-top" boxes that are used to access video and audio content provided by cable and satellite broadcast service providers. Generally, machine 500 will include one or more processors 502 coupled to a bus 504. The machine will also generally include memory 506, storage 508, a display controller 510, an input/output controller 512 and an audio controller 514, each of which is also coupled to bus 504.

In one embodiment, machine 500 interfaces to external systems and networks through a communications interface 516. Communications interface 516 may include a radio transceiver compatible with AM, FM, TV, digital TV, DVB, wireless telephone signals or the like. Communications interface 516 may also include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

In one embodiment, a carrier wave signal 517 is received by communications interface 516 to communicate with a network 120. Also connected to the network are one or more service providers 519. In general, the machine may establish a communications link a service provider in order to register a new service, enter or select scheduling information, save and retrieve customer account data, perform set-up operations, etc. The communications link may also enable the set-top box to query programming packages and the like (as discussed above with reference to block 304), which are stored in a database 523. In one embodiment, carrier wave signal 517 is considered to be machine readable media, which may be transmitted through wires, cables, optical fibers or through the atmosphere, or the like.

In one embodiment, processor 502 may be a conventional microprocessor, such as for example but not limited to an Intel x86 or Pentium family microprocessor, a Motorola family microprocessor, or the like. Optionally, the processor may comprise a micro-controller, or the like. Memory 506 may be a machine-readable medium such as dynamic random access memory (DRAM) and may include static random access memory (SRAM). Display controller 510 controls in a conventional manner a display 518, which in one embodiment may be a cathode ray tube (CRT), a liquid crystal display (LCD), an active matrix display, a television monitor or the like. In one embodiment, a remote interface 520 is provided to support interaction with remote input devices, such as remote control 112 and a remote keyboard 122. Other remote input devices may also be used. Wired input devices may also be supported as well. A panel control interface 521 may also be provided to enable user input from a user input panel or the like provided by the machine.

In one embodiment, audio controller 514 controls in a conventional manner audio output 522, which may include, audio speakers, headphones, an audio receiver, amplifier or the like. In one embodiment, the audio controller also controls in a conventional manner audio input 524, which may include a microphone or input(s) from an audio or musical device, or the like.

Storage 508 in one embodiment may include machine-readable media such as, for example, but not limited to a magnetic hard disk, an optical disk, a read-only memory (ROM) component, a smart card or another form of storage for data. In one embodiment, storage 508 may include removable media, read-only media, readable/writeable media or the like. Some of the data may be written by a direct memory access process into memory 506 during execution of software in machine 500. It is appreciated that software may reside in storage 508, memory 506 or may be transmitted or received via modem or communications interface 516. Optionally, all or a portion of the software may be stored in a firmware storage device 526. For the purposes of this specification, the term "machine-readable media" shall be taken to include any media that is capable of storing data, information or encoding a sequence of instructions for execution by processor 502 to cause machine 500 to perform the operations of the embodiments of the invention discussed above. The term "machine-readable media" shall be taken to include, but is not limited to solid-state memories, optical and magnetic disks, carrier wave signals, and the like.

In some configurations, machine 500 may include personal video recorder (PVR) or digital video recorder (DVR) functionality, wherein the machine will be used to store content corresponding to movies, television shows, and the like. Typically, the content will be initially received as an audio/video (A/V) input signal 530. The A/V input signal may originate from one or more sources, including a cable broadcast 532, a satellite broadcast 534, or a local television broadcast 536. The A/V input signal may also be provided by a playback device, such as a DVD player 538 or VCR 540. It will be appreciated that other content input devices may be used as well, such as computers and the like.

Typically, upon receiving A/V signal 530, the signal will either be used for storing content, and/or passed through for display purposes. In cases in which the content is to be stored, the A/V signal will usually be encoded by an encoder 542 and stored as encoded content 544 in storage 508. A decoder 545 is used to decode the encoded content during playback operations. The encoding and decoding operations may be provided by embedded components (e.g., MPEG encoders and decoders), by processor 502, or a combination of the two. In addition to storing encoded content, storage 508 may be used to store corresponding content information 546, such as recording directories and the like. Content information 546 is used to also represent the various control access-related tables described herein (i.e., the system database).

In general, the operations of the embodiments described above will be implemented by executing software code stored in one or more software modules. Collectively, this software code is represented as logic 550. As shown, logic 550 may be stored in firmware device 526 and/or storage 508. Logic 550 also represents common set-top box applications, such as recording applications and electronic program guides and the like. In some instances, logic 550 may be updated via a download, which may be received via a primary connection (e.g., a cable input), or via a back-channel connection (e.g., an internet connection routed over telecom equipment). Accordingly, in one embodiment firmware device 526 comprises a rewriteable component, such as flash memory.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A method comprising:
   generating, by a computing device, a user interface having a moving option, the selection of which is configured to provide an option to reconnect the computing device to a programming service;
   receiving, by the computing device, one or more recommended programming channels selected by at least one of the computing device and a content provider of the programming service, the one or more recommended programming channels being selected from a plurality of available programming channels based on one or more user preferences, wherein the selected one or more recommended programming channels includes a channel to which the user is not subscribed;
   determining, by the computing device, one or more recommended programming packages, wherein the one or more recommended programming packages comprise the one or more recommended programming channels; and
   generating, by the computing device, an interactive screen enabling user selection of a programming package to subscribe to from the one or more recommended programming packages.

2. The method of claim 1, further comprising:
   generating one or more other interactive screens configured to display information pertaining to the one or more recommended programming channels.

3. The method of claim 2, wherein the information pertaining to the one or more recommended programming channels is displayed in a comparative format comparing features provided by respective programming channels.

4. The method of claim 1, wherein the interactive screen is further configured to allow selective viewing of information pertaining to the one or more recommended programming packages.

5. The method of claim 1, further comprising transmitting a selection of the programming package to the service provider.

6. The method of claim 1, further comprising receiving an authorization code configured for accessing the selected programming package.

7. The method of claim 1, further comprising:
   determining an amount of time the user has spent watching a plurality of content of a same content type, wherein said determining comprises tracking a plurality of aggregate times for a plurality of content types, respectively, each of the plurality of aggregate times corresponding to an amount of time a user has spent watching a plurality of content for a corresponding content type.

8. The method of claim 1, further comprising:
determining an amount of time the user has spent watching a plurality of content of a same content type, wherein the one or more recommended programming channels are selected based on the amount of time the user has spent watching the plurality of content of the same content type.

9. A non-transitory machine-readable medium storing machine readable instructions that, when executed, cause an apparatus to:
generate a user interface having a moving option, the selection of which is configured to provide an option to reconnect the apparatus to a programming service;
receive one or more recommended programming channels selected by at least one of the apparatus and a content provider of the programming service, the one or more recommended programming channels being selected from a plurality of available programming channels based on one or more user preferences wherein the selected one or more recommended programming channels includes a channel to which the user is not subscribed;
determine one or more recommended programming packages, wherein the one or more recommended programming packages comprise the one or more recommended programming channels; and
generate an interactive screen enabling user selection of a programming package to subscribe to from the one or more recommended programming packages.

10. The non-transitory machine-readable medium of claim 9, storing further machine readable instructions that, when executed, cause the apparatus to:
generate one or more interactive screens configured to receive the one or more user preferences, the one or more user preferences including user specified viewing preference information;
identify the one or more recommended programming channels based on the user specified viewing preference information; and
generate one or more interactive screens configured to display information pertaining to the one or more recommended programming channels that are identified.

11. The non-transitory machine-readable medium of claim 10, wherein the information pertaining to the identified one or more recommended programming channels is displayed in a comparative format comparing features provided by each of the one or more recommended programming channels and comparing a cost of each of the one or more recommended programming channels.

12. The non-transitory machine-readable medium of claim 9, wherein the interactive screen is further configured to allow selective viewing of information pertaining to the one or more recommended programming packages.

13. The non-transitory machine-readable medium of claim 9, storing further machine readable instructions that, when executed, cause the apparatus to:
receive an authorization code configured for accessing the selected programming package.

14. The non-transitory machine-readable medium of claim 9, wherein at least one channel of the one or more recommended programming channels includes a plurality of programs.

15. The non-transitory machine-readable medium of claim 9, storing further machine readable instructions that, when executed, cause the apparatus to:
determine an amount of time the user has spent watching a plurality of content of a same content type, wherein the one or more recommended programming channels are selected based on the amount of time the user has spent watching the plurality of content of the same content type.

16. An apparatus comprising:
a processor; and
memory operatively coupled to the processor and storing computer readable instructions that, when executed, cause the apparatus to:
generate a user interface having a moving option, the selection of which is configured to provide an option to reconnect the apparatus to a programming service;
receive one or more recommended programming channels selected by at least one of the apparatus and a content provider of the programming service, the one or more recommended programming channels being selected from a plurality of available programming channels based on one or more user preferences wherein the selected one or more recommended programming channels includes a channel to which the user is not subscribed;
determine one or more recommended programming packages, wherein the one or more recommended programming packages comprise the one or more recommended programming channels; and
generate an interactive screen enabling user selection of a programming package to subscribe to from the one or more recommended programming packages.

17. The apparatus of claim 16, wherein the interactive screen is further configured to allow selective viewing of information pertaining to the one or more recommended programming packages.

18. The apparatus of claim 16, further comprising instructions for receiving an authorization code configured for accessing the selected programming package.

19. The apparatus of claim 16, further comprising instructions that, when executed, cause the apparatus to:
determine an amount of time the user has spent watching a plurality of content of a same content type, wherein the one or more recommended programming channels are selected based on the amount of time the user has spent watching the plurality of content of the same content type.

* * * * *